Patented Feb. 13, 1945

2,369,218

UNITED STATES PATENT OFFICE 2,369,218

PREPARATIONS OF SCARLET FEVER TOXIN FOR ADMINISTRATION BY MOUTH

George F. Dick and Gladys H. Dick, Evanston, Ill., and Jonathan E. Wood, Prospect Park, Pa.; said Jonathan E. Wood assignor to said George F. Dick and said Gladys H. Dick No Drawing. Application January 2, 1941, Serial No. 372,888

5 Claims. (Cl. 167—78)

This invention relates to the production and use of a toxin specific to scarlet fever for oral administration.

The toxin specific to scarlet fever disclosed in the patent to Doctors George F. Dick and Gladys Henry Dick, No. 1,547,369, issued July 28, 1925, has been highly successful in immunization against and prevention of scarlet fever, and has been widely used throughout the United States and foreign countries for that purpose. It has been heretofore administered by hypodermic injections which have sometimes been accompanied by difficulties in administration and use.

We have found that due to the injection of various preparations for the prevention of other diseases, such as diphtheria and tetanus, that there is an increasing incidence of sensitization to proteins contained in culture mediums, and that this sometimes interferes with subsequent immunization against scarlet fever by hypodermic injection of the toxin disclosed in the above mentioned patent. In certain individuals reactions such as vomiting may occur following one or more of the hypodermic injections of the toxin due to the fact that it is not possible to increase the dosage gradually enough without making too many injections, and sometimes due to the fact that in the more dilute solutions for earlier injections in a given instance the toxin has deteriorated from not being used sufficiently soon after being diluted.

In some instances, as where a patient is affected with severe heart lesions or hemophilia, and who might be seriously affected by an attack of scarlet fever, there has been a reluctance on the part of physicians to administer the toxin hypodermatically.

In immunization against scarlet fever hypodermatically it has been found advisable to extend the immunization over a period of approximately four weeks. In many instances it is highly desirable to lessen this immunication period, especially in scarlet fever epidemics.

We so prepare and condition a toxin specific to scarlet fever that it may be readily administered by mouth, and with as satisfactory immunizing results as though injected hypodermatically, and without the difficulties incident to such injections and so that it maintains its potency for a longer period of time than the toxin diluted for hypodermic injection.

After ascertaining that the toxin specific to scarlet fever may be absorbed in the blood stream from the alimentary tract and that it is not digested by pepsin or trypsin, we found that when the toxin was so prepared and conditioned that the time required for its solution in the body of the patient is longer than the time during which toxin may be expected to normally remain in the stomach and shorter than the time normally required for it to leave the small intestine, it may be administered orally with highly satisfactory immunizing results and without the difficulties incident to its being injected hypodermatically and the dosage increased more gradually. When prepared in accordance with our invention the toxin may be administered orally at shorter intervals than when injected hypodermatically, and the period required for immunization may be substantially lessened.

Preparation of toxin

In order to obtain the proper toxin for immunization by mouth, hemolytic streptococci identified as scarlet fever streptococci through their production of the soluble toxin specific to scarlet fever are grown in a suitable culture medium. An illustration of a satisfactory culture medium of low protein content is one which consists of a solution of—

| | Percent |
|---|---|
| Sodium chloride | 0.5 |
| Witte's or proteose peptone in distilled water | 1.0 |

This preparation is heated until it boils and is then neutralized with normal sodium hydroxide so that the pH is 7.0, and is then sterilized in an autoclave and allowed to cool.

A solution of sugar such as dextrose, lactose or maltose of known strength, 20% being a convenient concentration, is also prepared in distilled water, sterilized and allowed to cool. After cooling the broth is inoculated with pure cultures of hemolytic streptococci determined to be specific for scarlet fever, and the sugar solution is added in amounts up to 1%. This sugar solution may be added all at one time or in divided amounts during the incubation period.

The inoculated broth is placed in an incubator and maintained at 35°–37° centigrade.

The hemolytic streptococci produce acid during their growth in this medium. As we have found that scarlet fever toxin is destroyed by more transient exposure to changes in hydrogen ion concentration, we keep the reaction of the broth at about pH 7.0 throughout the incubation period in order to obtain a toxin of high potency and stability. This neutralization may be accomplished by hourly determinations of the reaction and addition of the indicated amounts of a sterile solution of alkali such as sodium hydroxide, or, more simply, by the addition of calcium carbonate powder to each container before the broth is sterilized and frequent shaking to keep the calcium carbonate distributed throughout the broth during the period of growth.

After thirty-six to forty-eight hours, the growth is usually heavy and the cultures may be removed from the incubator. Smears and plate cultures may be made from each flask or bottle to determine the purity of the cultures, any contaminated flasks being discarded and the rest saved for concentration.

To stop further growth of the streptococci, with attendant production of acid, and to render the toxin containing broth free from living scarlet fever streptococci, a germicidal or sterilizing substance may be added in suitable amount. For this purpose phenol may be used in amount sufficient to result in a 0.5% solution of phenol in the broth, or the streptococci may be removed from the broth culture by filtration through a filter, such as a Berkefeld "W," of such density that the streptococci do not pass through the filter. Our practice has usually been to add 0.5% phenol and then filter.

After the streptococci are killed, removed, or both, the toxin containing broth should be kept clean and free from bacteria, moulds or other substances which might prove harmful when ingested, although it is not necessary to keep it sterile.

*Concentration of the toxin*

This may be done by the following or similar procedures:

1. The toxin containing broth may be concentrated or evaporated from the liquid state in a vacuum chamber in which the fluid is first frozen and then evaporated from the frozen state. If the toxin is to be administered in the liquid state, it is not necessary to evaporate it to dryness, only enough evaporation being required to obtain a sufficient concentration of the toxin so that the required doses are contained in a small volume.

2. The toxin may be concentrated by adding to the toxin containing broth, a protein precipitating substance such as ammonium or sodium sulphate or alcohol in suitable amounts, reserving the precipitate and drying it in a dessicator or redissolving the precipitate in distilled water and evaporating in a vacuum chamber from the frozen state. If the toxin is precipitated with a sulphate, care is taken that too much sulphate is not left in the precipitate. This may be accomplished by promptly blotting the wet precipitate between layers of filter paper, or by dialysis. If dialysis is employed, loss of toxin may be minimized by use of a membrane, such as Cellophane #1200.

3. The toxin may be concentrated by first precipitating it from the toxin containing broth with ammonium or sodium sulphate, redissolving the precipitate in a comparatively small volume of distilled water and reprecipitating it with alcohol.

In concentrating the toxin one method of precipitation which we have found satisfactory is to add to the chilled toxin containing broth three to four times its volume of chilled ethyl alcohol (95% or anhydrous), allowing the mixture to stand until the precipitate flocculates, filtering and redissolving the precipitate in distilled water, freezing the solution and evaporating it to a white, or almost white, substance in vacuum.

Evaporation may be conducted in the air but evaporation in a vacuum seems preferable because oxidization may destroy scarlet fever toxin. If evaporation is carried on at a low temperature there is less likelihood that some of the scarlet fever toxin may be destroyed.

When the concentrated toxin is obtained, it is standardized by means of testing various appropriate dilutions (rendered free from bacteria by filtration through a suitable porcelain filter) by means of skin tests made by intradermal injection of 0.1 c. c. of each dilution and comparing the resulting reactions with the reactions resulting in the same susceptible individuals from the intradermal injection of one standard skin test dose of scarlet fever toxin.

When the potency of the concentrated toxin has been determined, it is ready for use in tablets, pills, capsules, perles or the like.

The toxin powder prepared by the methods described may contain from twenty-five million to seventy-five million skin test doses of toxin per gram.

*Preparation of the concentrated toxin for oral administration*

If the concentrated toxin is employed in liquid form the doses are accurately measured and filled into suitable containers that are enteric sealed or coated.

If the dry form of concentrated toxin is employed, weighed portions of the powder may be diluted with inert and harmless substances and filled into capsules or made into pills or tablets containing the required amounts of toxin by any convenient method such as rolling or compressing.

One satisfactory method of preparing tablets from the dry toxin is as follows:

A weighed amount of the standardized toxin, for example, 0.8 gram, is placed in a clean glass mortar and triturated with pure lactose, 26 grains, and best grade of acacia, 2 grains, until a homogeneous powder is formed. The material is then screened through a silk sieve and granulated with 3 drops of distilled water. The granulated material is dried in the open air at room temperature and 1 grain corn starch and 1 grain talc added. 2.12 grains of the resulting mixture is compressed into a tablet ¼ inch in diameter. If the dried toxin used contained 25,000,000 skin test doses of toxin per gram, each tablet made by this method should contain 1,000,000 skin test doses of scarlet fever toxin.

The dry powder containing the toxin with or without mixture with such substances as starch, lactose, talc or acacia may be filled into capsules or similar containers.

After the tablets, pills, capsules, perles or the like containing the scarlet fever toxin, in either liquid or dry form, have been prepared they are ready for enteric coating or sealing.

Tablets, pills and capsules of scarlet fever toxin coated and sealed with a variety of enteric materials have been employed. These coatings have consisted of substances such as the following used alone or in the various combinations.

Stearic acid, stearates, oleates, shellac suitable for food, ammoniated shellac, gelatine treated with formaldehyde, mastic, cerates, cetyl alcohol, waxes and synthetic resins.

In general, enteric coatings are "timed coatings," or "environmental coatings," or a combination of the two types.

The timed coatings are so constituted that the time required for solution of the tablet when placed in fluids such as water or watery solutions of weak acid is longer than the period of time the tablet may be expected to remain in the stomach under normal conditions, and shorter than the time normally required for the tablet to leave the small intestine.

The environmental coatings are largely composed of substances which dissolve more readily in the intestinal fluids than in the more acid fluids of the normal stomach; so that the tablets do not, as a rule, disintegrate until they reach the intestine.

The term enteric is used to indicate a substance or substances which will largely prevent exposure of the medicament in the stomach and yet permit exposure of the medicament in the intestine.

One example of a satisfactory coating described as belonging to the group of timed coatings consists of a powdered mixture of fatty acid, wax and hygroscopic vegetable components with a binding agent such as white shellac. A satisfactory form of it may be prepared by melting together 55.5 parts stearic acid, 24.25 parts carnauba wax and 1.75 parts of petrolatum. To this hot mixture are added 13.9 parts finely powdered agar and 4.6 parts finely powdered elm bark. The mixture is then allowed to cool and ground to a fine powder. In coating these tablets they may be placed in a revolving coating pan and a solution of white shellac suitable for food dissolved in 95% ethyl alcohol poured into the revolving pan in an amount sufficient to coat the tablets evenly. An adequate amount of the powdered material previously prepared is then added while the pan continues to rotate. Due to the adhesiveness of the shellac, the tablets take up an even coating of the powder. The tablets are then placed on trays and flamed briefly on both sides.

A satisfactory example of an environmental enteric coating with which good results have been obtained in oral immunization against scarlet fever is a synthetic resin of the polyhydric alcohol polycarboxylic acid group. Such a resin may be prepared by fusing together stearic acid (17.57 parts), phthalic anhydride (53.65 parts) and glycerol (27.78) in an aluminum dish at 200° C. until the acid number has been reduced to 45. The resulting waxy resin is dissolved in a volatile solvent such as methyl propyl ketone and introduced in appropriate amounts into a rotating coating pan containing the tablets to be coated. When enough of the solvent has been evaporated so that the tablets tend to stick together, any aggregations are broken up and powdered talc is introduced into the rotating pan to assist in the drying process and prevent the tablets sticking together. When sufficiently dried, the tablets are removed from the pan and spread on trays while the drying is completed.

Regulation of dosage

Whatever type of preparation is used, it is necessary to regulate the dosage of scarlet fever toxin according to the rate of disintegration or solution of the tablet. One simple way of making preliminary tests is by placing some of the tablets of scarlet fever toxin to be tested in a 0.3% solution of hydrochloric acid in distilled water, and placing other tablets in a physiologic solution of sodium chloride buffered at pH 7.0. The solutions containing the tablets may be agitated from time to time. If the tablets disintegrate in the acid solution at room or body temperature in less than three hours, they are apt to cause nausea in certain doses when administered to persons susceptible to scarlet fever. If the tablets are substantially insoluble in the stomach under normal conditions, the dosage of scarlet fever toxin required to immunize persons susceptible to scarlet fever is related to the speed of disintegration of the tablets after they reach the intestine.

In some instances when enteric coated tablets that disintegrated in the buffered salt solution within three hours were administered, the maximum daily dosage required to produce immunity, as determined by the skin reaction to the intradermal injection of one and two skin test doses of scarlet fever toxin, was three million skin test doses of scarlet fever toxin administered orally in the form of enteric coated tablets.

In other immunization, in which the enteric coated tablets administered did not disintegrate in the buffered salt solution until after eight to ten hours, the maximum daily dosage required to produce immunity to both one and two skin test doses of toxin injected intradermally was six to ten million skin test doses administered by mouth.

Attempts to change during the course of immunization from enteric coated tablets of a prolonged disintegration time to tablets requiring a shorter time for disintegration have resulted in nausea and vomiting unless the dosage was reduced.

It has also been learned that the dosage of scarlet fever toxin administered by mouth in the form of enteric coated preparations for the purpose of immunizing persons susceptible to scarlet fever against that disease should be properly graduated in order to avoid unnecessary nausea, vomiting and diarrhoea. This similarly applies to the tablets without enteric coating.

Because of the wide range in time required for solution or disintegration of the various enteric materials employed by the different manufacturers of biologic products, it is apparent that to obtain the greatest usefulness to the public of this simple method for preventing scarlet fever, correct standardization of the toxin and the solubility of the enteric coated preparations to be furnished by the various manufacturers must be carefully controlled; further, the dosage should be related to the type of coating and proper graduation of the dosage should be assured.

We wish the term "tablet" or "tablets" as used in the specification and claims to be interpreted as including not only tablets but pills, perles, capsules or other preparations suitable for administration by mouth, containing scarlet fever toxin free from living scarlet fever streptococci, in either dry or liquid from.

The term "concentrating" is employed in the specification and in the claims to cover not only the evaporation of the toxin containing medium, whether under atmospheric or reduced pressure, or from the liquid or the frozen state, to produce a concentrated toxin still in the liquid state, or a toxin containing solid, whether substantially dry or dried, but also the toxin in substantially dry or dried form when obtained by precipitation or by a combination of precipitation and evaporation. The term "concentrated" is used in the specification and claims to cover the product of any of the just defined concentrating methods.

Having now described our invention, we claim:
1. A tablet for oral administration comprising a toxin specific to scarlet fever derived from hemolytic streptococci and free from living scarlet fever streptococci, the toxin being of such potency that approximately one million skin test doses is contained in the tablet substantially one-fourth inch in diameter, and an enteric covering for protecting the toxin against absorption in the stomach but permitting its being absorbed while in the intestine when thus administered.

2. A tablet for immunizing against scarlet fever, of a size suitable for oral administration containing a toxin specific to scarlet fever derived from hemolytic streptococci and free from living scarlet fever streptococci, having a potency of approximately one million skin test doses, and an enteric coating for protecting the toxin against absorption in the stomach but permitting its being absorbed in the intestine, when thus administered.

3. A preparation for immunizing against scarlet fever comprising a concentrated powdered toxin specific to scarlet fever derived from hemolytic streptococci and free from living scarlet fever streptococci, embodied in a tablet of a size suitable for oral administration having a potency of at least one million skin test doses, and an enteric coating for protecting the toxin against absorption by the body until it reaches the intestines where it is released, when thus administered.

4. An immunizing preparation for oral administration, comprising a concentrated powdered toxin specific to scarlet fever derived from hemolytic streptococci and free from living scarlet fever streptococci, having a potency of approximately twenty-five million to seventy-five million skin test doses per gram, in tablet form of a size suitable for oral administration, such tablets being of the concentrated potency as to produce immunity when absorbed in the intestines and covered with an enteric coating which will prevent the toxin being absorbed until it reaches the intestines and permitting its being absorbed while there, when administered orally.

5. A tablet for producing general, anti-toxic immunity against scarlet fever when administered orally, comprising a soluble bacterial toxin specific to scarlet fever derived from hemolytic streptococci and free from living scarlet fever streptococci, the toxin having a potency of at least twenty-five million skin test doses per gram of toxin with such tablets containing sufficient toxin and being of such concentrated potency as to produce immunity when absorbed in the intestines, and an enteric covering for preventing the toxin in the tablets from being absorbed as it passes from the mouth and through the stomach but permitting its being absorbed while in the intestines, when thus administered.

GEORGE F. DICK.
GLADYS H. DICK.
JONATHAN E. WOOD.